UNITED STATES PATENT OFFICE.

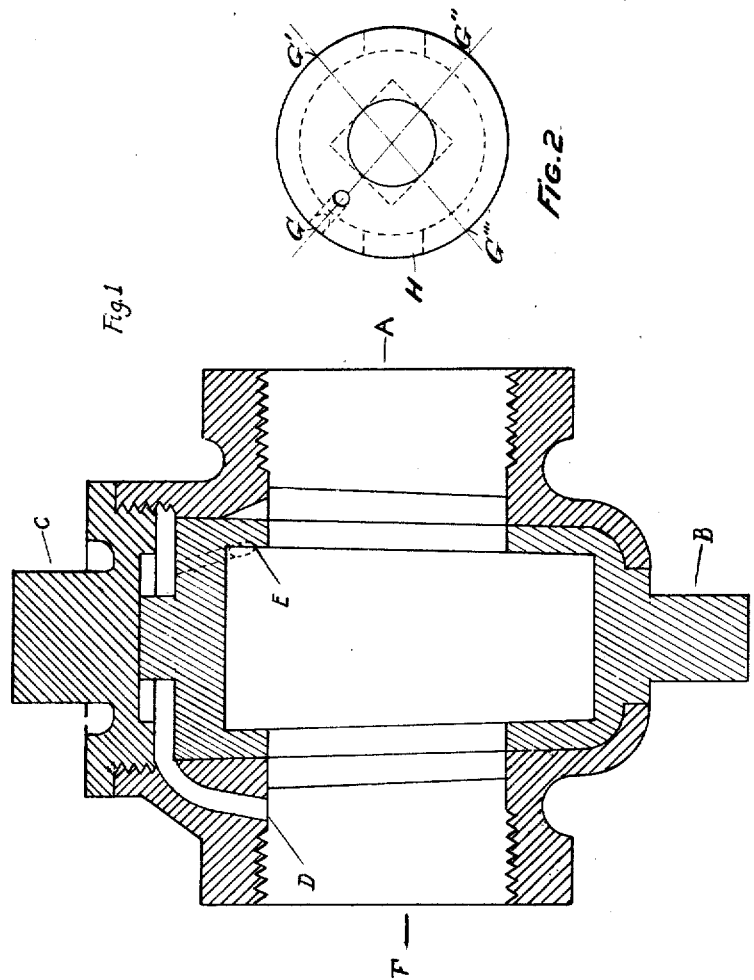

GEORGE W. SHIELDS AND BRADFORD WEBSTER, OF LOUISVILLE, KENTUCKY.

VALVE.

No. 911,546.　　　Specification of Letters Patent.　　　Patented Feb. 2, 1909.

Application filed February 20, 1908. Serial No. 416,931.

*To all whom it may concern:*

Be it known that we, GEORGE W. SHIELDS and BRADFORD WEBSTER, citizens of the United States, residing at Louisville, in the county of Jefferson and State of Kentucky, have invented a new and useful Valve, of which the following is a specification.

Our invention relates to valves or stopcocks for controlling the flow of steam, compressed air, water, or any other gas or fluid which is conducted in pipes or passages; and the objects of our improvement are, first, to provide a plug, so formed that the wear of friction will not lessen the tightness and snugness of its fit and at the same time that it may turn freely and not become wedged under pressure; second, to afford facilities for steam, or other gas or fluid, to operate automatically, when the valve is closed to keep the plug tight; and, third, to afford facilities for automatically blowing out the chamber wherein such steam pressure or other pressure is applied, so as to make it unnecessary to remove the cap of the valve to clean it. We attain these objects by the mechanism illustrated in the accompanying drawing in which—

Figure 1 is a vertical section of the entire valve; Fig. 2 is a plan of the plug, showing the relative position of the small exhaust passages and the main passage in the valve.

The valve consists of three pieces; the main body, fitted to receive an exhaust pipe in A and an inlet pipe in F, a taper plug between the points C and B; a taper plug; and a cap to screw over the larger end of the valve which receives the plug.

The main body of the valve has a small passage, commencing at D, in the inlet, whereby the steam pressure in the inlet pipe is admitted to the circular chamber, between the large end of the plug and the cap, and applied to the large end of the plug to press it into the body of the valve to make it fit snug. This passage is always open, and when the valve is closed, the entire static pressure of the steam or other fluid is applied to the large end of the plug. The small end of the plug is fitted with a ball joint to relieve the wear upon the taper sides of the plug and to prevent the plug from wedging under pressure, as it would do if all the pressure was applied on the taper sides. This ball joint is most important because it enables the plug to be turned readily without relieving the pressure upon the larger end of the plug. The plug, when in position, extends outside of the main body of the valve with a tongue at B, at which point the valve is turned on and off.

To prevent the necessity of unscrewing the cap C to clean out the chamber where the steam pressure is applied to the large end of the plug, a passage is made from the face of the large end of the plug, diagonally through the plug, to a point on the taper side of the plug where the passage may open into the main exhaust passage of the valve. With reference to the main opening H (Fig. 2) through the central part of the plug whereby the valve is opened, this small exhaust passage is so placed at one or more of the points G, G' G'', or G''' that its opening does not meet the opening in the main body of the valve into the exhaust part thereof, which it is intended to meet, when the valve is completely closed and when the valve is wide open, but only when the plug is being turned from closed to open, during which process the small passage of the plug meets the opening in the main body of the valve at E just before the main body of the valve begins to open, whereby the full pressure of the steam or other fluid blows out the chamber at the large end of the plug just before the main passage of the valve becomes open. This arrangement is necessary, because the chamber would not be blown out clean if the passage was only open when the full flow of steam or other fluid was passing through the main passage of the open valve. This arrangement keeps the entire valve clean by the automatic action of the moving steam or fluid.

We claim:

In a valve or stop-cock, a valve casing having inlet and outlet exhaust openings, a rotary plug therein having a main passage adapted to connect the inlet and exhaust openings, said casing having a chamber at one end of the plug connected with the inlet, said plug having an auxiliary passage adapted to connect said chamber with said exhaust opening when the plug is turned.

GEORGE W. SHIELDS.
　　　　　　　　BRADFORD WEBSTER.

Witnesses:
　ARTHUR C. POPHAM,
　KATHERINE ARNETT.